(12) United States Patent
Rule

(10) Patent No.: US 6,347,546 B1
(45) Date of Patent: Feb. 19, 2002

(54) METHOD OF NON-DESTRUCTIVE TESTING AN EVACUATED PACKAGE FOR A LEAK

(75) Inventor: Martin Christopher Rule, Kenilworth (GB)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/307,822

(22) Filed: May 7, 1999

(30) Foreign Application Priority Data

Aug. 5, 1998 (EP) .............................. 98303645

(51) Int. Cl.[7] .......................... G01M 3/34; G01M 7/00; G01N 19/02
(52) U.S. Cl. ...................... 73/49.3; 73/12.01; 73/12.06
(58) Field of Search .............................. 73/49.3, 40, 37, 73/37.5, 45.4, 12.01, 12.06, 12.11, 12.13, 52; G01M 3/36, 3/34

(56) References Cited

U.S. PATENT DOCUMENTS

| 3,913,383 A | * | 10/1975 | Kreula et al. ................... 73/52 |
| 4,213,329 A | * | 7/1980 | Raymond et al. ............... 73/52 |
| 4,517,827 A | | 5/1985 | Tapscott ...................... 73/45.4 |
| 5,309,750 A | * | 5/1994 | Riley ............................. 73/52 |

FOREIGN PATENT DOCUMENTS

| JP | 02038835 | * | 2/1990 | ............ G01M/3/24 |
| JP | 08180725 | * | 8/1993 | ............ G01M/3/24 |
| WO | 9421996 | * | 9/1994 | ............ G01M/3/24 |

OTHER PUBLICATIONS

Patent Abstracts of Japan vol. 018, No. 450 (P–1790), Aug. 22, 1994 & JP 06 148021A (Shibuya Kogyo Co Ltd), May 27, 1994 Abstract.
Patent Abstracts of Japan vol. 095, No. 009, Oct. 31, 1995 & JP 07 140032A (Hitachi Ltd), Jun. 2, 1995 Abstract.

* cited by examiner

Primary Examiner—Hezron Williams
Assistant Examiner—Jay L. Politzer
(74) Attorney, Agent, or Firm—Thomas A. Marcoux

(57) ABSTRACT

A method is described of non-destructive testing an evacuated package for the presence of a leak, said evacuated package comprising a sealed filled evacuated bag (1) containing a predetermined quantity of a comminuted product, which comprises:

causing a surface (2) of a sealed filled evacuated bag (1) under test to impact under controlled conditions with a supported piezo electric device (7), and measuring a resultant transient electrical test signal.

13 Claims, 3 Drawing Sheets

METHOD OF NON-DESTRUCTIVE TESTING AN EVACUATED PACKAGE FOR A LEAK

FIELD OF THE INVENTION

This invention relates to a non-destructive method of testing an evacuated package for a leak. More particularly it relates to a method for detecting in a non-destructive manner the presence of a leak in a package comprising an evacuated bag containing a charge of a comminuted product.

DESCRIPTION OF THE PRIOR ART

It is known to package a comminuted product, such as roast and ground coffee, in a sealed evacuated bag. For aesthetic reasons and for convenience of packing such packages in cartons, it is conventional practice to impart to the evacuated package a regular shape, for example a rectangular parallelepipedal shape. Such packages typically contain, for example, 250 g or 500 g of roast and ground coffee. A properly evacuated and sealed package is hard to the touch and resembles a brick. It is, however, difficult to ensure that every package produced is free from leaks. This is because the particles of roast and ground coffee are relatively light and the surface of a charge of coffee in a bag being sealed can be disturbed in the course of evacuating the bag, with the resultant danger of coffee particles being deposited upon the inside surface of the bag where the seal is to be formed. If there are coffee particles in this area, then the seal may not be properly formed and a leak may ensue. A coffee package with a leaking bag will feel softer to the touch than one with a properly evacuated leak-free bag and will have a shorter shelf life. In addition any aroma components introduced into the bag during the packaging operation can escape from a package with a leak with the result that the product may be less appealing to a consumer. In addition a package with a leak in it, i.e. with a loss of a barrier to oxygen, will result in rancidity in the coffee due to the deleterious effects of oxygen upon the coffee.

A number of proposals have been made for detecting the presence of a leak in coffee packages comprising evacuated bags. These generally rely upon contacting the evacuated and sealed bags with a lightly sprung mechanical probe or with an air jet. An example of such an arrangement is described in U.S. Pat. No. 4,517,827.

DETAILED DESCRIPTION OF THE INVENTION

It is an object of the invention to provide a method for the non-destructive leak testing of evacuated sealed packages comprising a sealed evacuated bag containing a charge of a comminuted product such as roast and ground coffee.

It is a further object of the invention to provide a simple non-destructive method of testing sealed evacuated bags of a comminuted product for the presence of a leak which obviates the need for complex mechanical devices for probing the packages.

It is a still further object of the present invention to provide a more sensitive method of detecting in a non-destructive manner the presence of a leak in an evacuated flexible package containing roast and ground coffee than conventional prior art methods.

According to the present invention there is provided a method of non-destructive testing an evacuated package for the presence of a leak, said evacuated package comprising a sealed filled evacuated bag containing a predetermined quantity of a comminuted product, which comprises:

causing a surface of a sealed filled evacuated bag under test to impact under controlled conditions with a supported piezo electric device, and measuring a resultant transient electrical test signal.

BRIEF DESCRIPTION OF THE DRAWINGS

In order that the invention may be clearly understood readily carried into effect a preferred method of non-destructive testing of evacuated packages for the presence of a leak conducted in accordance with the invention will now be described, by way of example only, with reference to the accompanying diagrammatic drawings, wherein.

DETAILED DESCRIPTION OF THE PREFERRED EMBODIMENTS

Figure 1:
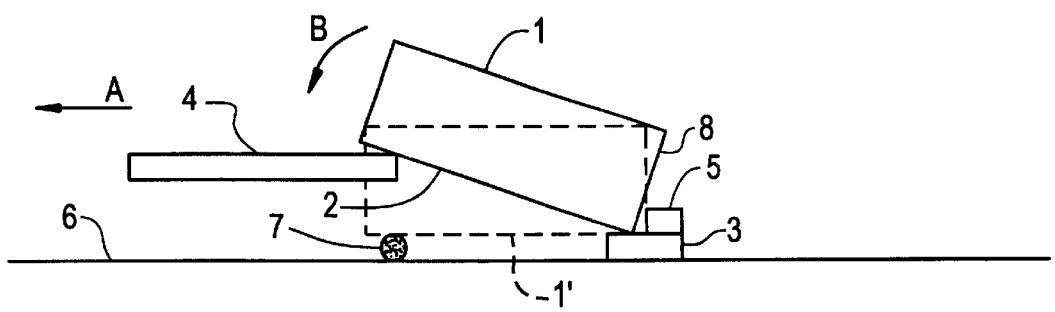
FIG. 1 illustrates a laboratory test apparatus for testing for the presence of a leak in an evacuated filled package containing a charge of a comminuted product.

The present invention provides a method of non-destructive testing an evacuated package for the presence of a leak. Such a package comprises a sealed filled evacuated bag containing a predetermined quantity of a comminuted product. In the method a surface of a sealed filled evacuated bag under test is caused to impact under controlled conditions with a supported piezo electric device. A resultant transient electrical test signal is measured.

Preferably the method further includes providing a reference filled evacuated package without a leak, causing a surface of the reference filled evacuated package to impact under the same controlled conditions with the supported piezo electric device, measuring the resultant transient electrical reference signal, comparing the electrical reference signal with the transient electrical test signal obtained from the bag under test, and rejecting the bag under test if the transient electrical test signal indicates the presence of a leak.

Measurement of the transient electrical reference signal with a reference package preferably precedes measurement of the transient test signal with a package under test. This step can be repeated from time to time to ensure that the method is producing consistent results and that no significant faults have developed in the equipment used.

It is preferred that the piezo electric device shall have a smaller surface area than the surface of the evacuated package under test which impacts the piezo electric device. Conveniently the piezo electric device is a piezo ceramic wire which may be supported in or on a support surface and substantially parallel thereto. Upon impact of the surface of a package with the piezo ceramic wire 7 a voltage is produced therein as a result of the compression of the wire in the direction of its diameter.

Typically the transient electrical test signal is a transient voltage signal. Thus the transient voltage signal measured may comprise a rate of change (dV/dt) of voltage (V) with time (t) or a peak voltage signal or both.

Furthermore the transient electrical reference signal may comprise a transient voltage signal, such as a peak voltage signal or a rate of change (dV/dt) of voltage (V) with time (t) or both.

According to a preferred procedure the evacuated package under test is allowed to fall under gravity under controlled conditions into contact with the piezo electric device. In one particularly preferred method the evacuated package is moved along a predetermined path, the piezo electric device is positioned at a test station along the predetermined path, and the evacuated package under test is allowed to fall into contact with the piezo electric device as it moves through the test station. In such a method, the evacuated package under test can be allowed to topple into contact with the piezo electric device as it passes through the test station. Alternatively the evacuated package under test can be allowed to drop from a predetermined height onto the piezo electric device as it passes through the test station.

Referring to FIG. 1 there is illustrated a laboratory apparatus for non-destructive testing for the presence of a leak in an evacuated package 1 which comprises a sealed evacuated bag containing a charge (e.g. 250 g or 500 g) of roast and ground coffee. This is formed by placing the bag in a holder having a rectangular parallelepipedal shape, filling the bag while in the holder with the requisite amount of roast and ground coffee, tamping the contents of the bag while still in the holder, evacuating the bag and its contents to a predetermined vacuum level (e.g. a vacuum of approximately 95 kPa, corresponding to an absolute pressure of approximately 5 kPa, assuming that atmospheric pressure is 100 kPa), and then sealing the bag. The resultant package is substantially parallelepipedal in shape and has a flat under face 2. If it has no leak, then the package 1 is hard and brick-like. On the other hand, if the package 1 has a leak, then it is softer. The package 1 is supported at one end on a fixed support 3 and at its other end at a higher level than that of the fixed support 3 by a movable support 4. Fixed end support 5 ensures that package 1 does not slide to the right as depicted in FIG. 1.

Package 1 is supported above a fixed support surface 6 on which is supported a piezo ceramic wire 7 which extends at right angles to the plane of FIG. 1. Movable support 4 is arranged at a fixed height above fixed support surface 6 and can be moved in the direction of arrow A a distance sufficient to allow the left hand end of package 1 (as depicted in FIG. 1) to drop onto piezo ceramic wire 7, as indicated by arrow B, to the position 1' indicated in broken lines. Upon impact with piezo ceramic wire 7 a transient voltage signal is generated therein which can be detected by a suitable detector and recorder (not shown) in conventional manner.

Figure 2:
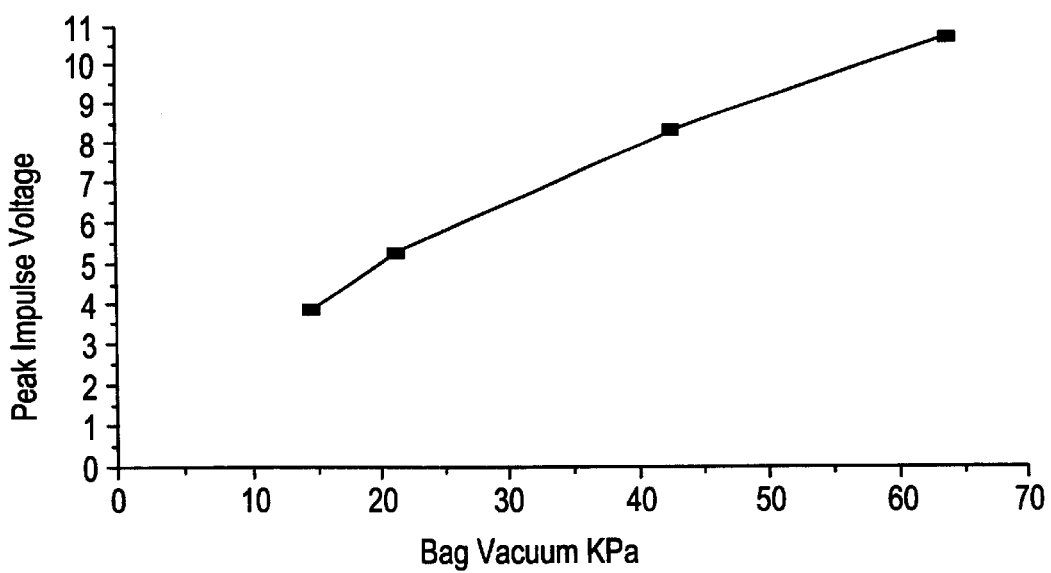
FIG. 2 is a graph showing the relationship between the peak voltage detected by the apparatus of FIG. 1 and the level of vacuum in evacuated packages.

An evacuated package 1 without a leak produces a higher peak voltage than a package with a leak. Accordingly measurement of the peak voltage detected provides a measure of the level of vacuum within the package under test. FIG. 2 shows the peak voltages measured using the apparatus illustrated in FIG. 1 for a series of packages evacuated to different levels of vacuum, ranging from about 15 kPa to about 65 kPa (corresponding to an absolute pressure of about 85 kPa to about 35 kPa). The target peak voltage (e.g. 11 volts) will depend upon the vacuum level to which the package 1 is evacuated, as well as upon such constant factors as the particular type of piezo ceramic wire used, the weight of the package 1, and the distance through which the package 1 falls under gravity onto the piezo ceramic wire 7.

Hence for most packaging applications the peak voltage detected provides a direct indication of the level of vacuum inside the package 1. If the peak voltage generated is less than a predetermined value, e.g. 10 volts, then this can be used to reject packages that are too soft due to the presence of a leak in the bag. In practice it has been found that the method of the invention provides a sensitive test for the presence of a leak in a package containing roast and ground coffee and enables the presence of a leak to be detected in a bag which cannot be detected manually by feeling the softness of the bag. Moreover, although the piezo ceramic wire 7 causes a detectable groove to be formed in the surface of a bag with a gross leak in it, a package without a leak is not marked significantly.

It will be readily apparent to those skilled in the art that the apparatus of FIG. 1 can readily be adapted for use in continuous packaging operations. For example, the fixed support 3 and the movable support 4 can each be replaced by a corresponding continuous belt running in a direction at right angles to the plane of FIG. 1 so that package 1 is carried at an inclined angle to the horizontal forwards into the plane of the paper until it reaches the end of the upper belt (corresponding to movable support 4) whereupon it falls off the end of the belt onto piezo ceramic wire 7. Further devices can then be provided either to reject package 1 if a leak is detected or to pass an intact package 1 forward for further packaging in readiness for dispatch to a customer.

In the apparatus of FIG. 1 package 1 is allowed to pivot about its right hand end through an angle of about 30° as it drops onto piezo ceramic wire 7. Alternatively it can be made to topple from an upright position in which it stands upon its base face 8 onto piezo ceramic wire 7 so that it pivots through 90° to position 1'. In yet another alternative the package is allowed to drop vertically with its base face 8 foremost from a predetermined height onto piezo ceramic wire 7.

Figure 3:
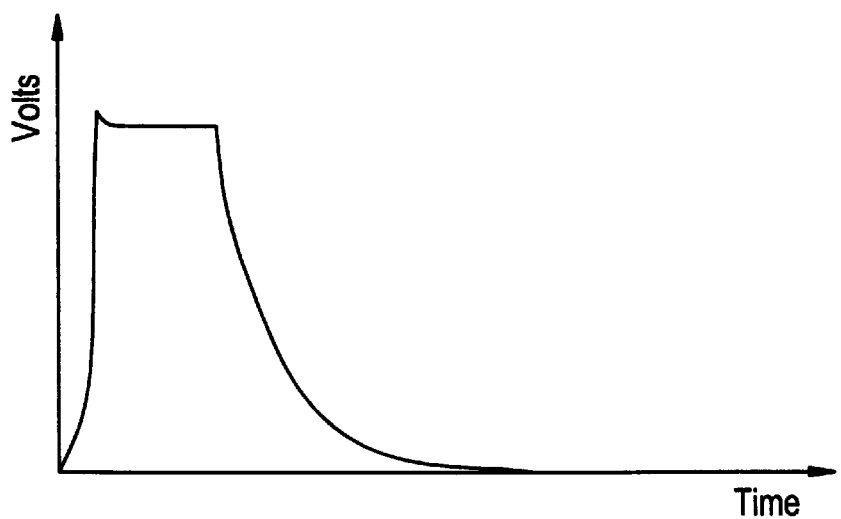
FIG. 3 illustrates the voltage signals generated for an intact package and for a package with a leak.
Figure 4:
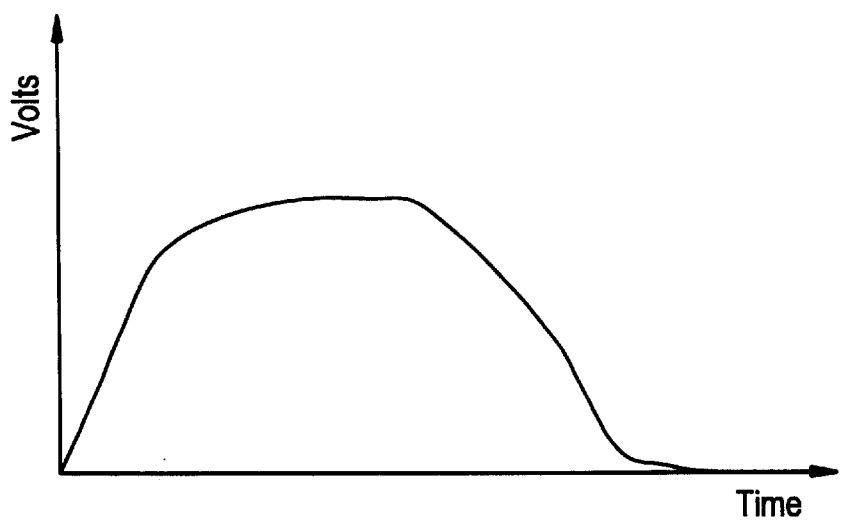
FIG. 4 illustrates the corresponding voltage signal for a package with a leak.

FIG. 3 illustrates the transient voltage signal 8 generated in piezo ceramic wire 7 by an intact package 1 while FIG. 4 shows the corresponding voltage generated by a package with a leak. The difference between the two peak voltage signals of FIGS. 3 and 4 can be used to distinguish between a leak-free bag and a one with a leak. Measurement of the initial steepness of the slope (dV/dt) provides an alternative method of detecting the presence of a leak in a package. This value (dV/dt) is greater for a package without a leak than for one with a leak. If desired, both the peak voltage signal and the measurement of dV/dt can be used simultaneously to distinguish between a package 1 with a leak and one that has no leak.

Figure 5:
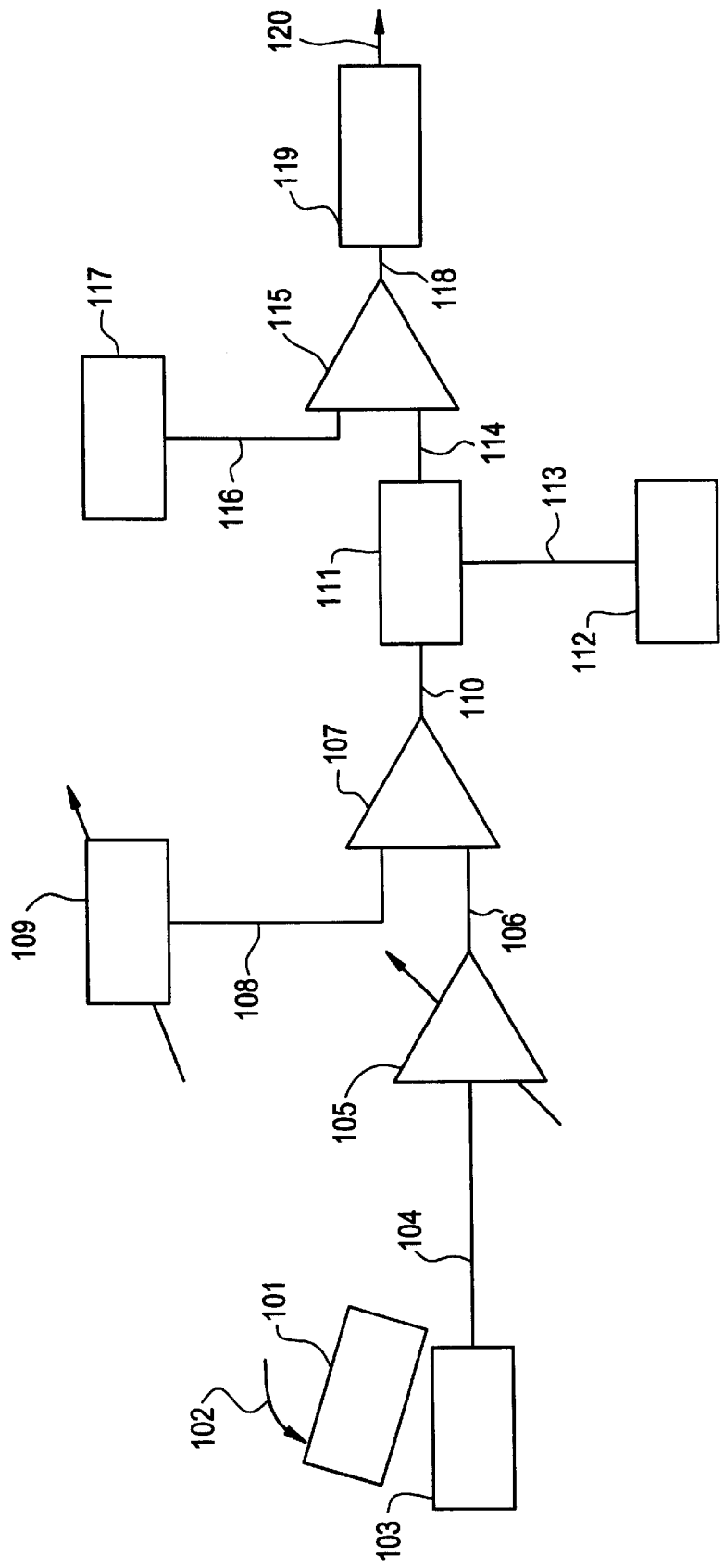
FIG. 5 is a block diagram of a leak detector for packages comprising vacuum sealed bags containing a comminuted material such as coffee.

FIG. 5 is a block circuit diagram of an apparatus for detecting soft bags, i.e. bags with a leak in them, of coffee or other comminuted material emerging one after another from a vacuum packaging line. As each bag 101 comes off the end of the packaging line it is caused to topple, as indicated by arrow 102, on to a piezo-ceramic wire 103. The impact of bag 101 on wire 103 results in a transient voltage signal being generated and fed via line 104 to the input of a high input impedance amplifier 105. The output signal from the amplifier 105 is fed by line 106 to a threshold comparator 107 which compares the peak voltage signal in line 106 with a threshold voltage supplied in line 108 from an adjustable threshold voltage generator 109. If the peak voltage signal in line 106 exceeds the voltage in line 108, thus indicating that the bag 101 is hard and has no leak, then the comparator sends a "set" signal in line 110 to an electronic latch 111. If the bag 101 is leak-free and hence hard so that the latch 111 will have been set by the signal in line 110, the voltage signal in line 114 can be read by a threshold comparator 115 and compared with a fixed threshold signal in line 116 from fixed threshold voltage generator 117. The comparison of the aforementioned signals on lines 114, 116 is such that there is then no resulting signal in line 118 to be passed to passed to an opto-isolation circuit 119 and hence no signal is generated in line 120. After falling on piezo-ceramic wire 103 the bag 101 continues along a predetermined path and so passes a bag sensor 112 which sends a "reset" signal in line 113 to latch 111.

On the other hand, if bag 101 has a leak in it, then the impact with wire 103 results in a correspondingly lower peak voltage in line 104 and the transient voltage signal in line 106 is insufficient to cause a corresponding signal to be sent along line 110. As a result the latch 111 remains reset and when the bag 101 with a leak in it passes the bag detection sensor 112, the latch 111 remains reset. The threshold comparator 115 accordingly receives no signal in line 114 and consequently a signal is generated in line 118. This signal is passed to opto-isolation circuit 120 which in turn generates a signal in line 120 indicating the presence of a soft bag 101 and initiating an appropriate bag rejection mechanism.

What is claimed is:

1. A method of non-destructive testing an evacuated package for the presence of a leak, which comprises:

providing an evacuated package comprising a sealed, flexible, filled, evacuated bag containing a predetermined quantity of a comminuted product;

causing a surface of the sealed filled evacuated bag to impact under controlled conditions with a supported piezo electric device to generate a resultant transient electric test signal having a peak voltage indicating the level of vacuum inside the package;

measuring a voltage characteristic of the resultant transient electrical test signal generated by said impact; and identifying the bag as having or not having a leak on the basis of said measured voltage characteristic.

2. A method according to claim 1, which further includes providing a reference filled evacuated package without a leak, causing a surface of the reference filled evacuated package to impact under the same controlled conditions with the supported piezo electric device, measuring the resultant transient electrical reference signal, comparing the electrical reference signal with the transient electrical test signal obtained from the bag under test, and rejecting the bag under test if the transient electrical test signal indicates the presence of a leak.

3. A method according to claim 1, in which the piezo electric device has a smaller surface area than the surface of the evacuated package under test which impacts the piezo electric device.

4. A method according to claim 1, in which the piezo electric device is a piezo ceramic wire.

5. A method according to claim 4, in which the piezo ceramic wire is supported in or on a support surface and substantially parallel thereto.

6. A method according to claim 1, in which the transient electrical test signal is a transient voltage signal.

7. A method according to claim 6, in which the voltage signal measured is a peak voltage signal.

8. A method according to claim 6, in which the transient voltage signal measured comprises a rate of change (dv/dt) of voltage (V) with time (t).

9. A method according to claim 1, in which the transient voltage signal measured comprised a rate of change (dV/dt) of voltage (V) with time (t).

10. A method according to claim 1, in which the evacuated package is allowed to fall under gravity under controlled conditions into contact with the piezo electric device.

11. A method according to claim 10, in which the evacuated package is moved along a predetermined path, in which the piezo electric device is positioned at a test station along the predetermined path, and in which the evacuated package under test is allowed to fall into contact with the piezo electric device as it moves through the test station.

12. A method according to claim 11, in which the evacuated package under test is allowed to topple into contact with the piezo electric device as it passes through the test station.

13. A method according to claim 11, in which the evacuated package under test is allowed to drop from a predetermined height onto the piezo electric device as it passes through the test station.

* * * * *